H. COHEN.
SPARE TIRE COVER.
APPLICATION FILED DEC. 7, 1908.
1,012,247.
Patented Dec. 19, 1911.
3 SHEETS—SHEET 1.
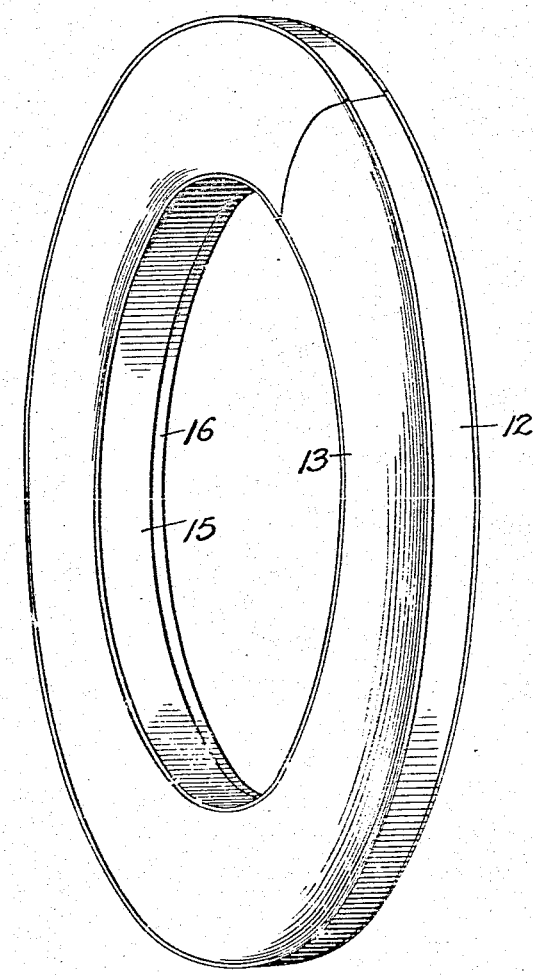
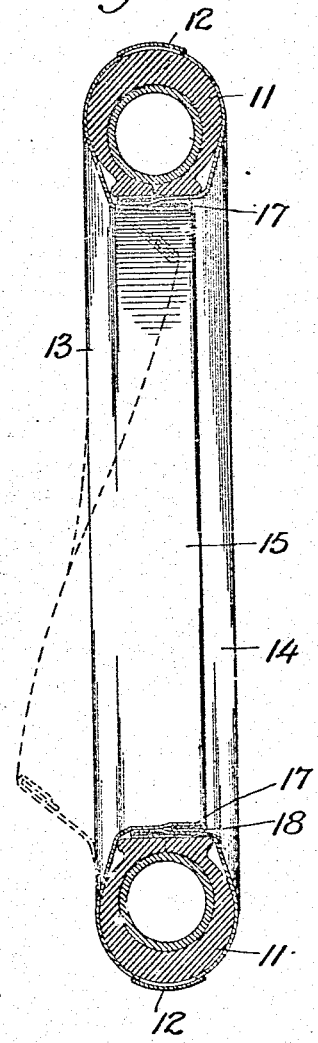
WITNESSES
James P. Duhamel
Aaron Hinsbey
INVENTOR
Hyman Cohen
BY
Thos. H. Bowerson
ATTORNEY H. COHEN.
SPARE TIRE COVER.
APPLICATION FILED DEC. 7, 1908.
1,012,247.
Patented Dec. 19, 1911.
3 SHEETS—SHEET 2.
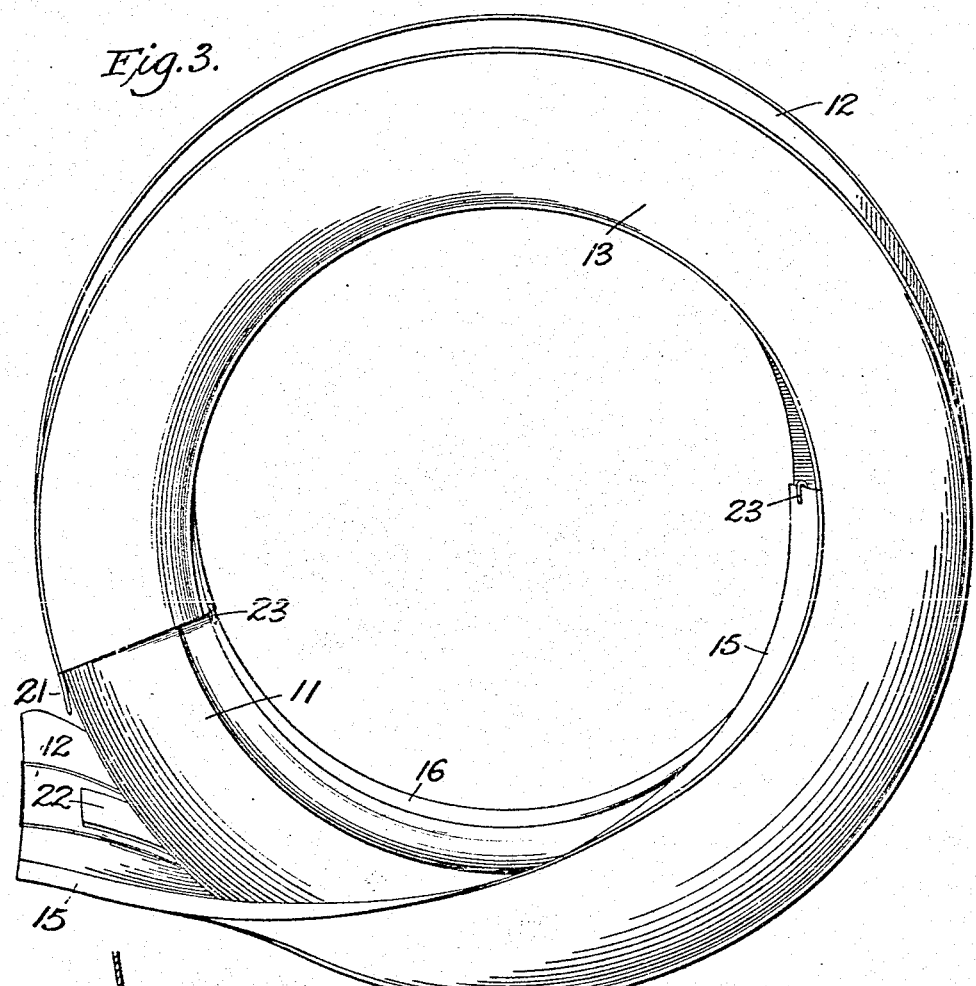
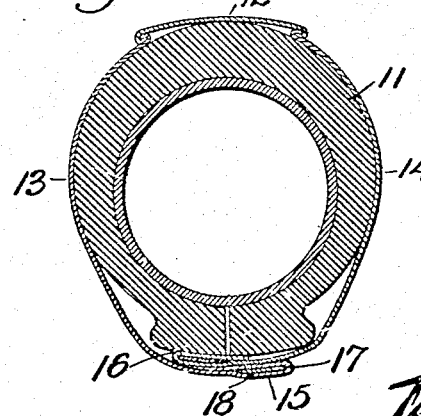
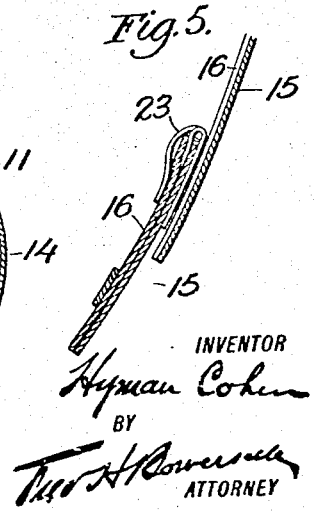
WITNESSES
INVENTOR
Hyman Cohen
BY
ATTORNEY

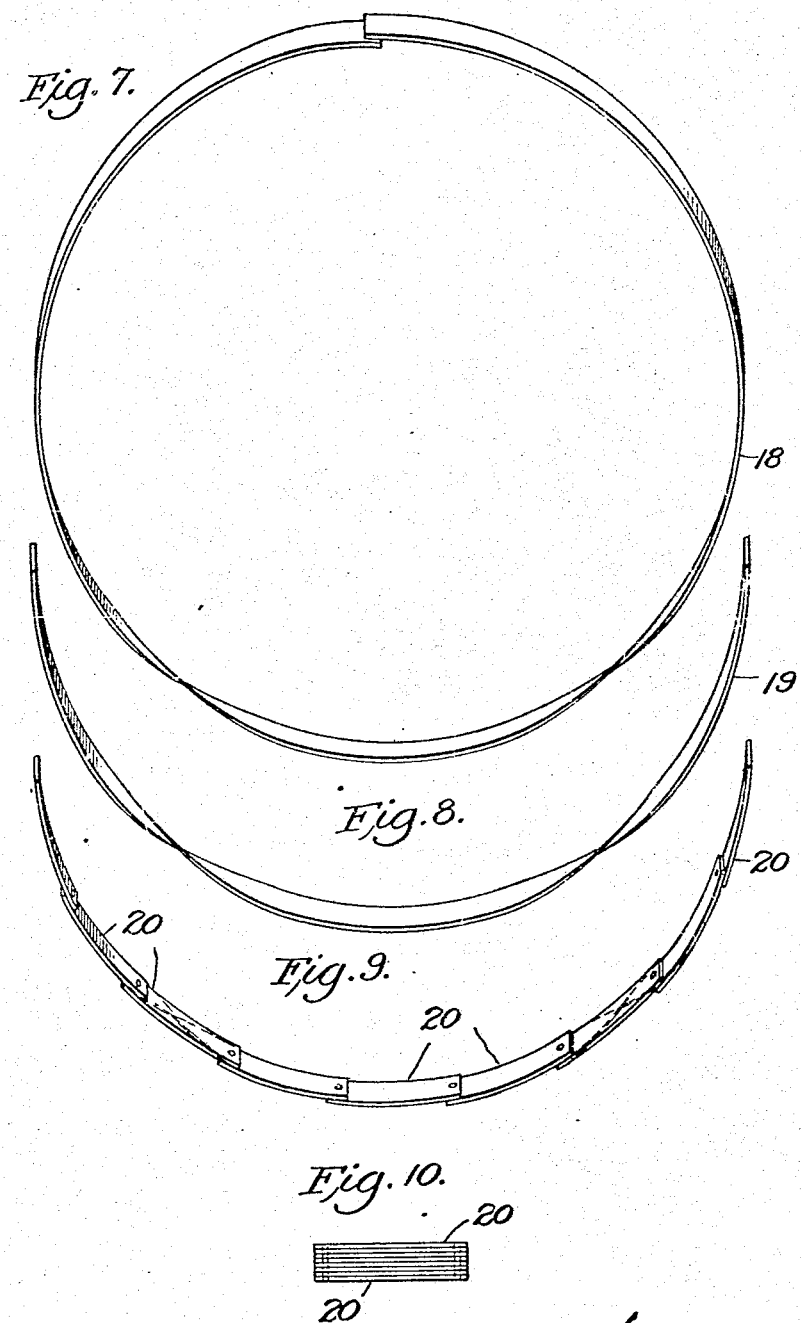

UNITED STATES PATENT OFFICE.

HYMAN COHEN, OF NEW YORK, N. Y.

SPARE-TIRE COVER.

1,012,247. Specification of Letters Patent. Patented Dec. 19, 1911.

Application filed December 7, 1908. Serial No. 466,215.

*To all whom it may concern:*

Be it known that I, HYMAN COHEN, a subject of the Emperor of Russia, residing in the city of New York, borough of Manhattan, in the county and State of New York, have invented certain new and useful Improvements in Spare-Tire Covers, of which the following is a specification.

This invention relates to means for covering and protecting a spare or extra tire, such as is usually carried by owners or drivers of automobiles to replace a tire in use which has become punctured or damaged and, therefore, at least temporarily unfit for use. It is well known that the annular configuration of these tires renders necessary the employment of a special form of cover or casing, if the appearance of the incased tire which is usually secured to some convenient portion of the body of the automobile—and general convenience and ready accessibility are taken into consideration. As more generally employed to-day these tire covers are made to approximately conform to the shape of the tire, and are provided with one or another form of fastening or securing means. Furthermore, effort has been made to enhance the degree of protection afforded by the cover by overlapping all exposed edges thereof in a downward direction, in order to more nearly perfectly shed rain, dust, oil from the machine, or other matter which might prove deleterious to the tire. This idea of more thoroughly protecting the tire against water and dirt is undoubtedly worthy of consideration, but foremost among the desirable qualities which a tire cover should possess is that of ease of removal of the cover when it is desired to use the tire, and, similarly the ease of wrapping this cover about an extra tire and fastening the same in the desired position on the machine.

The principal object of the present invention is the provision of a spare tire cover or case which may be placed upon a tire in the shortest possible space of time and which will permit of the removal of the tire therefrom with the least possible effort and delay, at the same time being snugly and firmly held in position around the tire and affording a degree of protection which is undoubtedly sufficient for all practical purposes.

My invention will be more readily understood by reference to the accompanying drawings, forming a part of this specification, in which—

Figure 1 is a perspective view of the tire cover with its inclosed tire; Fig. 2 is a vertical central transverse section thereof, the dotted lines illustrating the manner in which the cover is removed; Fig. 3 is a perspective front view of the same with one end of the cover partially removed; Fig. 4 is an enlarged sectional view through the tire and its protecting case; Fig. 5 is an enlarged longitudinal sectional view of the inside overlapping ends of the flaps; Fig. 6 is a similar view of the outside overlapping ends of the cover; Fig. 7 is a perspective view of the retaining spring-strap, illustrating the manner of generating and applying the yielding forces which retain my tire cover in its closed condition yet permit of ready removal of the same from the tire. Fig. 8 illustrates one of two substantially semi-circular straps which may be employed instead of a single circular strap; Fig. 9 is a perspective view of a foldable or collapsible strap, and Fig. 10 shows the collapsible strap in its folded condition.

Referring now to the drawings in detail, numeral 11 refers to any usual form of tire for automobile or other vehicles, and while I have herein shown the outer tire or shoe, it will be apparent that my casing may be equally well employed as a protecting medium for the inner tube of what are known as double-tube tires and for other annular bodies.

My casing is preferably made from waterproof duck or drill cut into sections of such configuration that when suitably secured together the same form a wrapper which, when placed around an annular body, such as the tire shown, will fit the same with a reasonable degree of snugness and without unseemly and inconvenient folds or wrinkles. In other words, it is my desire that this cover, when inclosing a tire, should be itself substantially circular-cylindrical and so far as possible smoothly cover the tire. As the best manner of providing a cover of this character, I prefer that it should include what is known as a crown strip 12, to the edges of which are suitably secured the side strips 13 and 14 to which, in turn, are suitably secured, respectively, the interior flaps or strips 15 and 16, these various sections being cut to such configuration that when secured together in the manner indicated, with said flap 15 overlapping the flap 16, a substantially circular-cylindrical cover is provided which completely incases the tire. At least the outer 15 of these inner flaps or strips, and preferably each thereof, is looped back upon itself at its edge and suitably secured to provide an elongated pocket or receptacle 17 at the free edge thereof, extending throughout the entire length of the flap. Within this pocket or receptacle which is made to snugly retain the same, is inserted a flat strap or band of normally straight but yieldingly elastic metal 18, such as a steel ribbon, the length of which should approximate the length of the flap. This flat band 18 of elastic metal should be, of course, sufficiently flexible to permit of its being bent into substantially circular form and elastically distortable by ordinary torsional strains to a reasonable extent without fracture. It will be apparent, particularly by reference now to Figs. 7 and 8, that when this metal band is in circular shape there is created, first, the usual forces tending to straighten said band, which forces are substantially radially directed and which therefore, when said band is in the pocket or receptacle of said flap, tend to hold said flap snugly and firmly against the underside of the inclosed tire; second, the usual resistance to torsional strains, tending to yieldingly retain the flap in place, but which may, however, be overcome by an excess of manual force. It will be therefore apparent that while this band as a whole cannot be, as it were, "turned inside out" at one operation, it can be so reversed, and thus permit of the opening of the flap which it secures, by subjecting either the end or the middle of said band to a torsional strain sufficient to overcome its natural tendency to retain its normal shape, which reversal when once started may be readily continued throughout the whole length of the strap. In other words, the resiliency of the flat strap or band enables the same to be what may be termed "snapped" in and out of place, the flap within which said band is contained, obviously, following the movement of said band and thus becoming either opened or closed, as the case may be. It will be noted that the effect will be substantially the same if one continuous band is employed throughout the whole length of the flap, or if said flap is divided into two independent halves, each half containing a yielding strap or band 19 which is, when in place, substantially semi-circular in form, as shown in Fig. 8. I prefer to employ a single strap, although this possesses the disadvantage of making the cover difficult to handle as an article of merchandise, said strap preventing the inclosing of the cover within a package of suitable and convenient size. For this latter reason alone, it is doubtless more desirable to divide the flap, as suggested, and to place within each section a strap which becomes substantially semi-circular when the cover is in place.

In Figs. 9 and 10, I have shown a collapsible strap, made up of a plurality of short sections 20 20 pivoted together at points near the ends thereof. It will be apparent that if rivets are provided which hold these ends snugly against each other, the strap when extended will have substantially the same resiliency as the integral strap hereinbefore described. Furthermore, if the pocket or receptacle in the flap is made to very snugly contain this collapsible strap, the pocket itself will prevent movement of the strap sections with reference to each other and insure the performance of the same function as those described with reference to the integral strap. At the same time, this sectional strap may be removed, and when the tire cover is sold or offered for sale in a folded and wrapped condition, said strap, instead of being somewhat inconvenient to handle on account of its length, if of one piece, may be compactly folded into small compass and readily inclosed in the same package with the cover, to be inserted in the latter when the same is made ready for use.

As suggested, it will be apparent that the outside flap alone may be provided with the elastic strap or band, the inner flap retaining its proper position on account of the pressure directed thereagainst by the outside flap and its inclosed spring-band. I have found, however, that best results are obtained by providing a similar band in the edge of the inner flap, in which manner I secure a substantially tight and entirely satisfactory casing.

It will be apparent that when the cover is in place, about a tire, it may be readily removed by simply grasping the edge of the outer flap and subjecting the spring-band therein to a torsional strain, to twist said band, into the configuration shown in Figs. 7 and 8, the flap being in this manner and by the operation thrown back to the position illustrated by the dotted lines in Fig. 2. The resiliency of the metal is ofttimes sufficient to cause this operation alone to be sufficient to reverse the flap throughout its entire length, but if not, a repetition of the operation, at another point, will serve the desired purpose. In a similar manner the cover may be quickly and readily placed upon a tire.

In order to facilitate the placing of the cover upon the tire, I prefer that the former should be provided with a projecting tongue 21, at one end thereof, said tongue being preferably a continuation of the crown-strip 12, and with a tongue 22 at the other and overlapping end thereof, said tongue 22 not projecting beyond the end of the cover. These tongues 21 and 22 provide what may be termed handles which may be grasped to draw the cover longitudinally and fit the same snugly upon the tire or other incased annular body.

As hereinbefore stated, I prefer that the inner flap or flaps 16 be provided with an elastic band, as well as the outer flap or flaps 15, as clearly shown in Fig. 2. When the inner flap or flaps as well as the outer flap or flaps include this resilient band, it will be apparent that a much more tight joint will be insured, if means such as the spring pressed clamping leaves 23 are provided secured to the end of the inner flap 16 and adapted to impinge against the end of the outer flap 15 and apply forces which tend to expand said outer flap within said inner flap and thus force said flaps together to form a substantially tight joint. Furthermore, it will be apparent that this clamping means tends to hold the ends of said flaps in place.

Many modifications of minor details of my improved spare tire cover will doubtless readily suggest themselves to those skilled in the art to which it appertains, and I therefore do not desire to limit my invention to the specific construction herein shown and described.

I claim as new and desire to secure by Letters Patent:

1. A tire cover, comprising a casing provided with overlapping flaps at its opening, and a flat resilient core in the outermost flap for forcing the same against the inner tire face, said core comprising a plurality of sections foldable upon each other.

2. A tire cover, comprising a casing provided with overlaping flaps at its opening, and a resilient core in each of said flaps abutting against each other to lock said flaps together, said cores comprising a plurality of sections foldable upon each other.

3. A tire casing including a split fabric tube having substantially straight parallel superimposed meeting flaps, and a metal band carried by each flap at the peripheral extremity thereof, and being of less width than that of the flap, said bands being resilient, the outer band exerting radial pressure against the inner flap, the bands having their inner sides in locking engagement with each other.

In testimony of the foregoing, I have hereunto set my hand in the presence of two witnesses.

HYMAN COHEN.

Witnesses:
J. C. LARSEN,
FRED H. BOWERSOCK.

Copies of this patent may be obtained for five cents each, by addressing the "Commissioner of Patents, Washington, D. C."